United States Patent
Woo et al.

(10) Patent No.: US 11,469,475 B2
(45) Date of Patent: Oct. 11, 2022

(54) SEPARATOR, LITHIUM METAL NEGATIVE ELECTRODE, AND LITHIUM METAL SECONDARY BATTERY HAVING SOLID SUPERACID COATING LAYER

(71) Applicant: Korea Electronics Technology Institute, Seongnam-si (KR)

(72) Inventors: Sanggil Woo, Suwon-si (KR); Jisang Yu, Yongin-si (KR); Goojin Jeong, Seongnam-si (KR); Jenam Lee, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 324 days.

(21) Appl. No.: 16/835,464

(22) Filed: Mar. 31, 2020

(65) Prior Publication Data
US 2020/0328392 A1    Oct. 15, 2020

(30) Foreign Application Priority Data

Apr. 9, 2019  (KR) .................. 10-2019-0041177

(51) Int. Cl.
*H01M 50/46* (2021.01)
*H01M 4/134* (2010.01)
(Continued)

(52) U.S. Cl.
CPC .......... *H01M 50/46* (2021.01); *H01M 4/134* (2013.01); *H01M 4/366* (2013.01); *H01M 4/382* (2013.01);
(Continued)

(58) Field of Classification Search
CPC ...... H01M 50/46; H01M 50/40; H01M 4/134; H01M 4/62; H01M 4/36
See application file for complete search history.

(56) References Cited

U.S. PATENT DOCUMENTS

2009/0280405 A1   11/2009   Sannier et al.
2012/0135333 A1*  5/2012    Meredith, III ...... H01M 8/1051
                                                         429/492
(Continued)

FOREIGN PATENT DOCUMENTS

EP   3 240 087 A1   11/2017
EP   3 444 872 A1    2/2019
(Continued)

OTHER PUBLICATIONS

Korean Office Action dated Jul. 14, 2020 in corresponding Korean Patent Application No. 10-2019-0041177 (6 pages in Korean).
(Continued)

*Primary Examiner* — Kenneth J Douyette
(74) *Attorney, Agent, or Firm* — NSIP Law (57) ABSTRACT

The present disclosure provides a separator, a lithium metal negative electrode, and a lithium metal secondary battery which include a solid superacid coating layer. The solid superacid coating layer suppresses a growth of lithium dendrites in a lithium metal secondary battery employing lithium metal as a negative electrode by improving a mobility and a reaction uniformity of lithium at an interface of the lithium metal negative electrode and an electrolyte solution. In the lithium metal secondary battery, the solid superacid coating layer comprising solid superacid material having a porous structure is formed on at least one of the lithium metal negative electrode and the separator.

6 Claims, 5 Drawing Sheets

(51) Int. Cl.
  *H01M 4/36* (2006.01)
  *H01M 4/62* (2006.01)
  *H01M 4/38* (2006.01)
  *H01M 10/0525* (2010.01)
  *H01M 10/0562* (2010.01)
  *H01M 4/02* (2006.01)

(52) U.S. Cl.
  CPC ........... *H01M 4/621* (2013.01); *H01M 4/628* (2013.01); *H01M 10/0525* (2013.01); *H01M 10/0562* (2013.01); *H01M 2004/021* (2013.01); *H01M 2004/027* (2013.01); *H01M 2004/028* (2013.01)

(56) References Cited

U.S. PATENT DOCUMENTS

| | | | | |
|---|---|---|---|---|
| 2014/0147710 | A1* | 5/2014 | Schaefer | H01M 10/4235 |
| | | | | 429/50 |
| 2018/0337405 | A1 | 11/2018 | Johnson | |
| 2019/0051886 | A1* | 2/2019 | Woo | H01M 4/13 |

FOREIGN PATENT DOCUMENTS

| | | |
|---|---|---|
| JP | 2008-285388 A | 11/2008 |
| KR | 10-1449421 B1 | 10/2014 |
| KR | 10-2018-0121391 A | 11/2018 |

OTHER PUBLICATIONS

Extended European Search Report dated Sep. 1, 2020 in counterpart European Patent Application No. 20167109.6 (7 pages in English).

* cited by examiner

SEPARATOR, LITHIUM METAL NEGATIVE ELECTRODE, AND LITHIUM METAL SECONDARY BATTERY HAVING SOLID SUPERACID COATING LAYER

CROSS-REFERENCE TO RELATED APPLICATIONS

The present application claims priority to Korean Patent Application No. 10-2019-0041177, filed on Apr. 9, 2019, in the Korean Intellectual Property Office, which is incorporated herein in its entirety by reference.

TECHNICAL FIELD

The present disclosure relates to a lithium metal secondary battery. More particularly, the present disclosure relates to a separator and a lithium metal negative electrode which include a solid superacid coating layer capable of suppressing a growth of lithium dendrites in a lithium metal secondary battery employing lithium metal as a negative electrode by improving the mobility and the reaction uniformity of lithium at an interface of the lithium metal negative electrode and an electrolyte solution. Also, the present disclosure relates to a lithium metal secondary battery employing the separator or the lithium metal negative electrode.

BACKGROUND

In light of digitization and performance improvement of electronic products and increasing consumer needs, efforts have been made to develop batteries being small, thin, and light weight or having high energy density and high capacity. In addition, in order to cope with energy and environmental issues, electric vehicles, hybrid electric vehicles, and fuel cell vehicles are attracting attention and demands for large-sized batteries for automotive power supplies are increasing.

A lithium-based secondary battery has been put to practical use as a kind of the small, light weight and high capacity rechargeable batteries, and is widely being used in portable electronic and communication devices such as mobile phones, small video cameras, and notebook computers. The lithium secondary battery is comprised of a positive electrode, a negative electrode, and an electrolyte, and can be charged and discharged through a process that lithium ions coming out of positive electrode active material during charging are deposited on negative electrode active material and dissolved again during discharge, thereby delivering energy while travelling back and forth between the electrodes.

In the lithium secondary battery, carbonaceous material is used for the negative electrode. However, since the carbonaceous material are already being used close to a theoretical capacity limit, it is difficult to implement a lithium secondary battery having a further higher energy density.

Therefore, many attempts have been made to utilize lithium metal that has a specific capacity of 10 times or greater as the negative electrode (hereinbelow, referred to as "lithium metal negative electrode"). A lithium secondary battery including such a lithium metal negative electrode is referred to as a lithium metal secondary battery hereinbelow.

However, the lithium metal negative electrode shows a characteristic of growing dendrites on a surface of the lithium metal negative electrode due to several reasons such as an uneven current concentration during oxidation and reduction reactions. The grown dendrites may result in a short circuit between the positive and negative electrodes and physically cause a loss of lithium, of which phenomenon is referred to as 'dead Li'.

In addition, the lithium metal negative electrode may exhibit problems of increasing specific surface area, repetitive formation of solid electrolyte interphase (SEI), and an increase of resistance, which may result in a low chare efficiency, a short circuit, and reduction of Coulombic efficiency. These problems may drastically degrade a stability and lifespan characteristics of the lithium metal secondary battery as cycles continue.

Such problems are caused by heterogeneous reactions occurring at an interface between the lithium electrode and the electrolyte and at the interface between the electrolyte and the separator.

Various researches have been conducted actively for a long time to solve the problems occurring at the interfaces. One of the approaches is directed to an enhancement of the SEI characteristics through an improvement of the electrolyte and additives. However, the SEIs and protective films formed in this manner exhibited common limitations such as low mechanical properties and reduction of effects in later cycles due to consumptive reactions.

Another approach is concerned with physical suppressions through a use of a coating film as an inactive coating layer or a solid electrolyte. This method still cannot fundamentally control a unidirectional growth of lithium dendrites deposited on the surface of the lithium metal negative electrode.

In another approaches for achieving homogeneous electrochemical lithium deposition and dissolution reactions, various attempts have been made regarding an improvement of surface properties of the lithium metal negative electrode or three-dimensional (3D) current collectors for lithium deposition with controlled charge distribution. These methods, however, cannot control the irreversible surface chemical reactions between lithium and the electrolyte having a high reactivity with lithium, and may result in a loss of both lithium and the electrolyte.

Thus, conventional approaches require a large amount of extra lithium to compensate for the loss of lithium and has a fundamental limitation in driving a current density. As a result, those methods show a limit in implementing a safe lithium metal secondary battery that ensures a high energy density and superior lifespan characteristics.

PRIOR ART REFERENCE

Korean patent publication No. 10-1449421 published on Oct. 2, 2014, and entitled Surface-treated cathode material for oxide-based lithium secondary battery with solid super acids and manufacturing method thereof

SUMMARY

Provided are a separator, a lithium metal negative electrode, and a lithium metal secondary battery which include a solid superacid coating layer capable of suppressing a growth of lithium dendrites that may occur during repetitive deposition and dissolution processes.

Provided are a separator, a lithium metal negative electrode, and a lithium metal secondary battery which include a solid superacid coating layer capable of enhancing a mobility of lithium ions in an electrolyte, thereby improving a concentration and a reaction uniformity of lithium at an interface between the lithium metal negative electrode and the electrolyte solution.

Provided are a separator, a lithium metal negative electrode, and a lithium metal secondary battery which include a solid superacid coating layer capable of suppressing unnecessary irreversible reactions such as side reactions that may occur during electrochemical deposition and dissolution processes and improving the reaction uniformity at the interface of the lithium metal negative electrode and the electrolyte solution.

Provided are a separator, a lithium metal negative electrode, and a lithium metal secondary battery which include a solid superacid coating layer that enhances mechanical properties of a relevant member as well as exhibits high energy density and superior lifespan characteristics.

According to an aspect of an exemplary embodiment, a separator for use in a lithium metal secondary battery having a lithium metal negative electrode includes: a separator body; and a solid superacid coating layer coated on the separator body and comprising solid superacid material having a porous structure.

According to another aspect of an exemplary embodiment, a lithium metal negative electrode for use in a lithium metal secondary battery includes: a lithium metal foil; and a solid superacid coating layer coated on the lithium metal foil and comprising solid superacid material having a porous structure.

According to yet another aspect of an exemplary embodiment, a lithium metal secondary battery includes: a positive electrode; a lithium metal negative electrode; a separator disposed between the positive electrode and the lithium metal negative electrode; and an electrolyte solution comprising lithium salt. A solid superacid coating layer comprising solid superacid material having a porous structure is formed on at least one of the lithium metal negative electrode and the separator.

The solid superacid coating layer may be formed on at least one of surfaces of the lithium metal anode and the separator facing each other.

The solid superacid coating layer may include 80 to 95 wt % of solid superacid material and 5 to 20 wt % of binder.

The solid superacid material may include sulfated zirconia having a particle size of 3 micrometers or less and have the porous structure.

The lithium metal secondary battery according to the present disclosure includes the solid superacid coating layer containing superacid material having the porous structure and formed on the surface of the separator or the lithium metal negative electrode interfacing with the electrolyte solution. The solid superacid coating layer can suppress the growth of lithium dendrites by improving the mobility and the reaction uniformity of lithium at the interface of the lithium metal negative electrode and the electrolyte solution.

As a result, the lithium metal secondary battery according to the present disclosure 1 may exhibit high energy density and superior lifespan characteristics.

In the case that the solid superacid coating layer is formed on the separator, it is possible to enhance mechanical properties of the separator. That is, since the solid superacid material contained in the solid superacid coating layer is made of solid particles having the porous structure, the solid superacid coating layer formed on the surface of the separator enhances the mechanical strength of the separator.

In the lithium metal secondary battery according to the present disclosure, catalytic reactions of the solid superacid contained in the solid superacid coating layer can suppress unnecessary irreversible reactions such as side reactions that may occur during electrochemical deposition and dissolution processes. Accordingly, it is possible to improve the reaction uniformity at the interface of the lithium metal negative electrode and the electrolyte solution.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

In the following description and the accompanied drawings, only parts necessary for understanding embodiments of the present disclosure will be described, and detailed descriptions of well-known functions or configuration that may obscure the subject matter of the present disclosure will be omitted for simplicity.

The terms and words used in the following description and appended claims are not necessarily to be construed in an ordinary sense or a dictionary meaning, and may be appropriately defined herein to be used as terms for describing the present disclosure in the best way possible. Such terms and words should be construed as meaning and concept consistent with the technical idea of the present disclosure. The embodiments described in this specification and the configurations shown in the drawings are merely preferred embodiments of the present disclosure are not intended to limit the technical idea of the present disclosure. Therefore, it should be understood that there may exist various equivalents and modifications which may substitute the exemplary embodiments at the time of filing of the present application.

Exemplary embodiments of the present disclosure will now be described in detail with reference to the accompanied drawings.

Example 1

Figure 1:
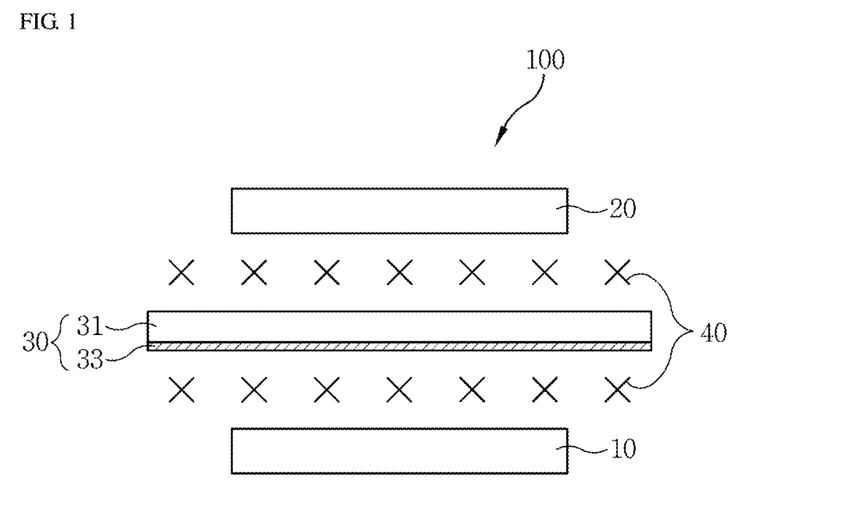
FIG. 1 is a schematic view illustrating a structure of a lithium metal secondary battery including a solid superacid coating layer according to Example 1 of the present disclosure.

FIG. 1 is a schematic view illustrating a structure of a lithium metal secondary battery including a solid superacid coating layer according to Example 1 of the present disclosure.

Referring to FIG. 1, a lithium metal secondary battery 100 according to Example 1 includes a lithium metal negative electrode 10, a positive electrode 20, a separator 30, and an electrolyte solution 40. Also, a solid superacid coating layer 33 is formed on a surface of the separator 30.

The lithium metal negative electrode 10 functionally can produce and consume electrons by electrochemical reactions, and provide the electrons to an external circuit through a negative electrode current collector. The lithium metal negative electrode 10 may include a lithium metal foil that can intercalate or deintercalate lithium ions reversibly.

The positive electrode 20 can produce and consume electrons by electrochemical reactions, and provide the electrons to the external circuit through a positive electrode current collector. The positive electrode 20 includes positive electrode active material, and may further includes a conductive agent and a binder. A lithium transition metal oxide such as $LiMO_2$ (where M may be V, Cr, Co, Ni, or a combination thereof), $LiM_2O_4$ (where M may be Mn, Ti, V, or a combination thereof), $LiMPO_4$ (where M may be Co, Ni, Fe, Mn, or a combination thereof), $LiNi_{1-x}Co_xO_2$ (where $0<x<1$), $LiNi_{2-x}Mn_xO_4$ (where $0<x<2$), and $Li[NiMnCo]O_2$ may be used for the positive electrode active material. Such a positive electrode active material may have a layered structure, a spinel structure, or an olivine structure depending on a kind of the active material.

The separator 30 is disposed between the lithium metal negative electrode 10 and the positive electrode 20 and separates the lithium metal negative electrode 10 and the positive electrode 20 from each other to prevent the lithium metal negative electrode 10 and the positive electrode 20 from being directly contacted and shorted. The separator 30 not only physically separates the lithium metal negative electrode 10 and the positive electrode 20, but also plays an important role in improving a stability of the battery.

The separator 30 according to Example 1 includes a separator body 31 and the solid superacid coating layer 33 containing solid superacid coated on the separator body 31.

The separator body 31 may include at least one of a polyolefin resin, a fluorine resin, a polyester resin, a polyacrylonitrile resin, or a microporous membrane made of cellulose material. For example, the polyolefin resin may include polyethylene, polypropylene, or the like. The fluorine resin may include polyvinylidene fluoride, pletetrafluoroethylene, and the like. The polyester resin may include polyethylene terephthalate, polybutylene terephthalate, and the like.

The solid superacid coating layer 33 may be formed on a surface of the separator body 31 facing the lithium metal negative electrode 10. Alternatively, the solid superacid coating layer 33 may be formed on an entire surface of the separator body 31.

The solid superacid coating layer 33 may include 80 to 95 wt % of solid superacid and 5 to 20 wt % of binder. In case that a ratio of the solid superacid is 95 wt % or greater, there may be a problem that the binder is insufficient and a bonding strength of the solid superacid coating layer 33 is low. In case that the ratio of the solid superacid is less than 80 wt %, the effect owing to the solid superacid may be reduced.

The binder may include polyvinylidene fluoride (PVdF), polyethylene, and the like.

The solid superacid have a higher acidity than 100% sulfuric acid. The solid superacid may be sulfated zirconia, sulfated titanium dioxide, sulfated tin dioxide, or sulfated aluminum oxide, but is not limited thereto. The sulfated zirconia refers to zirconia ($ZrO_2$) whose solid particle surface is modified with sulfate ion ($SO_4^{2-}$). The sulfated titanium dioxide refers to titanium dioxide ($TiO_2$) whose solid particle surface is modified with the sulfate ion ($SO_4^{2-}$). The sulfated tin dioxide refers to tin dioxide ($SnO_2$) whose solid particle surface is modified with the sulfate ion ($SO_4^{2-}$). The sulfated aluminum oxide refers to aluminum oxide ($Al_2O_3$) whose solid particle surface is modified with the sulfate ion ($SO_4^{2-}$).

For example, the sulfated zirconia having a particle size of 3 micrometers or less and having a porous structure may be used as the solid superacid.

Such sulfated zirconia may be prepared, for example, by sequentially performing a sol-gel process based on zirconium n-propoxide in anhydrous N-propanol and sulfuric acid, an alcohol substitution drying process, and a calcination process.

The sol-gel process may proceed as follows. First, zirconium propoxide is dissolved in n-propanol at a concentration of 0.5-2.0 M to prepare zirconium n-propoxide in anhydrous n-propanol. Next, the zirconium n-propoxide in anhydrous n-propanol is mixed with a sulfuric acid solution. Water is added such that the molar ratio of water to zirconium propoxide is in a range of 5-20 until the mixed solution becomes a gel.

The alcohol substitution drying process may proceed as follows. The gel prepared in the sol-gel process is aged at 40 to 60° C. After alcohol is substituted for the remaining water, the gel is dried at 40 to 60° C. to obtain a dried powder.

The calcination step process may as follows. The dried powder is calcined at 500-700° C. for 2 to 5 hours to prepare the sulfated zirconia. At this time, the prepared sulfated zirconia may further proceed to a pulverization step so as to have a particle size of 3 micrometers or less. Accordingly, the finally prepared sulfated zirconia has a particle size of 3 micrometers or less and has the porous structure.

As mentioned above, the separator 30 has the solid superacid coating layer 33 formed on its surface interfacing with the electrolyte solution 40. However, since the solid superacid forming the solid superacid coating layer 33 has a particle size of 3 micrometers or less and a porous structure, the deposition and dissolution of lithium ions may take place smoothly through the solid superacid coating layer 33 during charging and discharging operations.

Meanwhile, the electrolyte solution 40 may include lithium salt and an organic solvent.

The organic solvent may include a polar solvent such as aryl compounds, bicyclic ethers, acyclic carbonates, sulfoxide compounds, lactone compounds, ketone compounds, ester compounds, sulfate compounds, sulfite compounds, and the like. For example, dimethoxyethane (DME), dioxolane (DOL), triethylene glycol dimethyl ether (TEGDME), diethylene glycol dimethyl ether (DEGDME) may be used as the electrolyte solvent, but the present disclosure is not limited thereto.

The lithium salt may include lithium bis(trifluoromethanesulfonyl)imide (LiTFSI), $LiPF_6$, $LiBF_4$, $LiClO_4$, $LiNO_3$, $LiCF_3SO_3$, $LiAsF_6$, $LiN(CF_3SO_2)_2$, $LiN(C_2F_5SO_2)_2$, lithium 4,5-dicyano-2-(trifluoromethyl)imidazolide (LiTDI), and the like. It may be preferable that an amount of the lithium salt is in a range of about 10 weight percent to 35 weight percent based on a total weight of the electrolyte. When the content of the lithium salt is less than 10 weight percent, the conductivity of the electrolyte is lowered and the performance the electrolyte performance may deteriorate. When the content of the lithium salt is greater than 35 weight percent, the viscosity of the electrolyte is increased and the mobility of the lithium ions may be lowered.

As described above, the lithium metal secondary battery 100 according to Example 1 includes the solid superacid coating layer 33 that contains superacid material having the porous structure formed on the surface of the separator 30 interfacing with the electrolyte solution 40. The solid superacid coating layer 33 can suppress the growth of lithium dendrites by improving the mobility and the reaction uniformity of lithium at the interface of the lithium metal negative electrode 10 and the electrolyte solution 40.

As a result, the lithium metal secondary battery 100 according to Example 1 may exhibit high energy density and superior lifespan characteristics.

Furthermore, the solid superacid coating layer 33 formed on the separator 30 according to Example 1 may enhance mechanical properties of the separator 30. That is, since the solid superacid material contained in the solid superacid coating layer 33 is made of solid particles having the porous structure, the solid superacid coating layer 33 formed on the surface of the separator 30 enhances the mechanical strength of the separator 30.

In the lithium metal secondary battery 100 according to Example 1, catalytic reactions of the solid superacid contained in the solid superacid coating layer 33 can suppress unnecessary irreversible reactions such as side reactions that may occur during electrochemical intercalation and deintercalation processes. Accordingly, the reaction uniformity at the interface of the lithium metal negative electrode 10 and the electrolyte solution 40 can be improved.

Manufacture and Performance Evaluation of Example 1 and Comparative Example 1

In order to evaluate the effect of the solid superacid coating layer formed on the separator according to Example 1 on the performance of the lithium metal secondary battery, separators and symmetric cells according to Example 1 and Comparative Example 1 were manufactured as follows.

Figure 2:
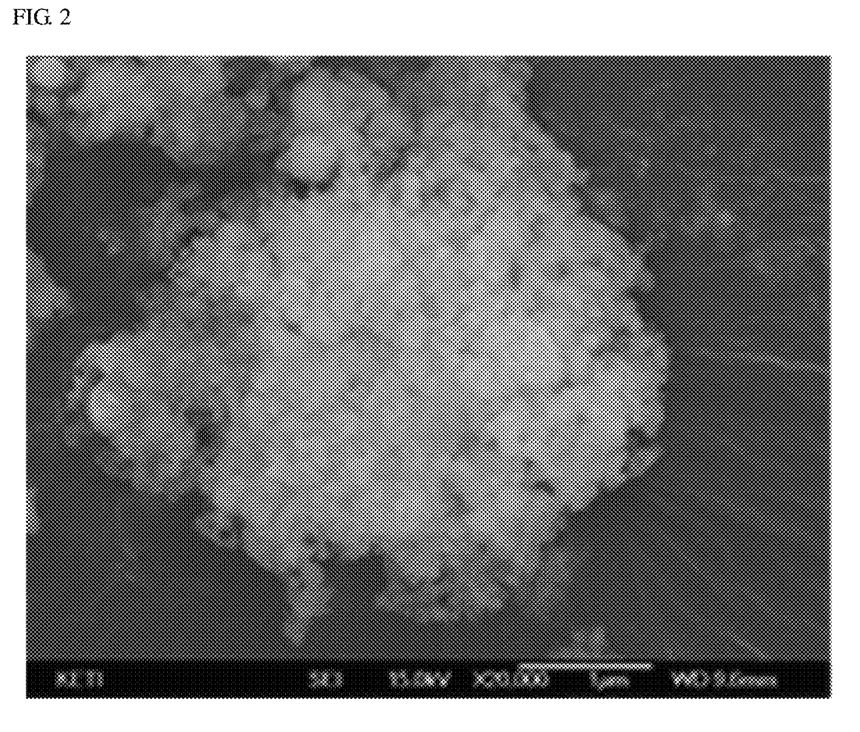
FIG. 2 is a scanning electron microscope (SEM) image of solid superacid material contained in the solid superacid coating layer shown in FIG. 1.

Sulfated zirconia was used as the solid superacid. Sulfated zirconia was prepared by sequentially performing the sol-gel process, the alcohol substitution drying process, and the calcination process as described above. Sulfated zirconia has a shape of homogeneous particles of 3 micrometers or less having a porous structure as shown in FIG. 2. FIG. 2 is a scanning electron microscope (SEM) image of solid superacid material contained in the solid superacid coating layer shown in FIG. 1.

Polyethylene was used as the separator body 31.

Figure 3:
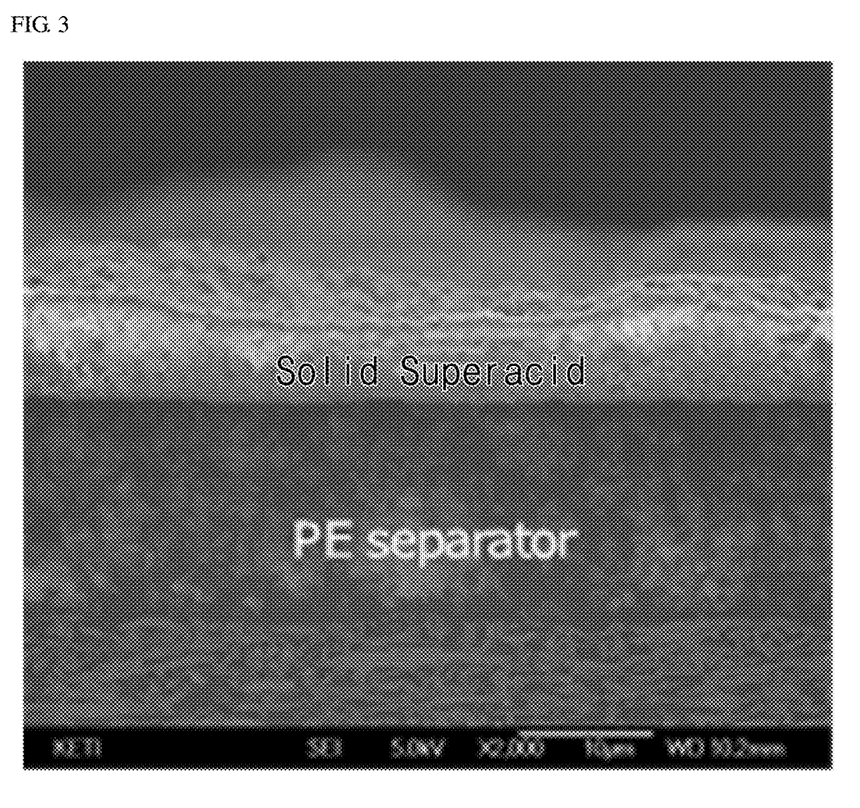
FIG. 3 is an SEM image of a separator coated with the solid superacid coating layer shown in FIG. 1.

According to Example 1, the separator was manufactured by forming the solid superacid coating layer on the surface of the separator body. The solid superacid coating layer includes sulfated zirconia and PVdF. That is, a slurry prepared by mixing the solid superacid and PVdF was coated on the separator body to form the separator according to Example 1 shown in FIG. 3. FIG. 3 is an SEM image of the separator coated with the solid superacid coating layer shown in FIG. 1.

According to Comparative Example 1, the separator body was used as the separator. In other words, the solid superacid coating layer was not formed on the separator body in the Comparative Example 1.

A lithium metal foil was used as the lithium metal negative electrode.

A mixture of 1M LiTFSI and DME/DOL 1:1 (1:1, v/v) was used as the electrolyte solution.

Symmetric cells, in which both the positive electrode and the negative electrode employ the lithium metal foil, according to Example 1 and Comparative Example 1 were manufactured in order to evaluate the effect of the solid superacid coating layer during repetitive deposition and dissolution processes.

Figure 4:
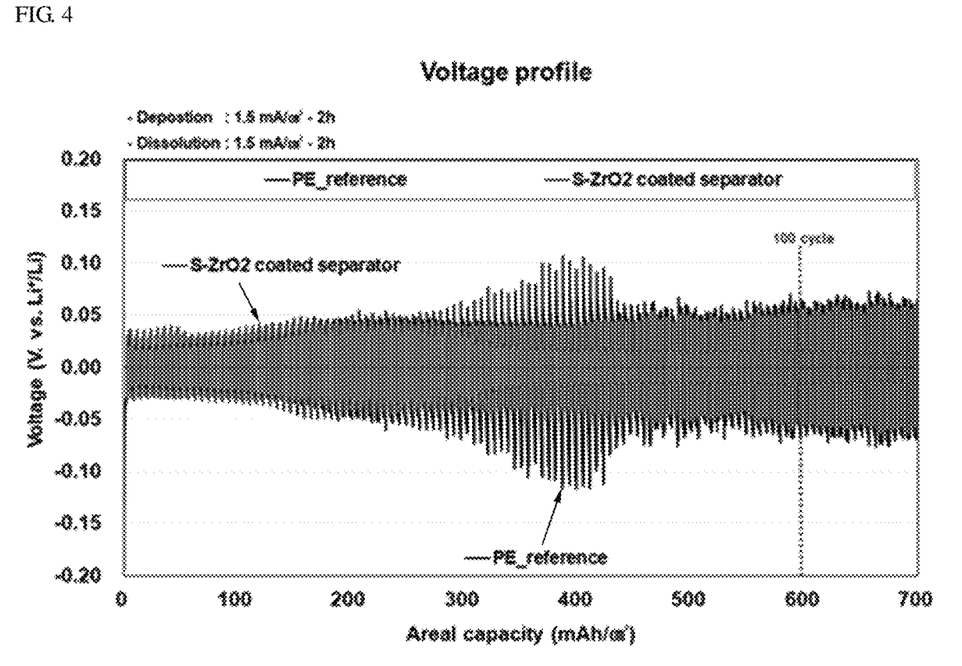
FIG. 4 is a graph illustrating electrochemical behaviors of symmetric cells according to Example 1 and Comparative Example 1.

The deposition and dissolution of lithium proceeded at a rate of 1.5 mA/cm$^2$ for 2 hours each and a whole cycle was repetitively performed. The results are shown in FIG. 4. FIG. 4 is a graph illustrating electrochemical behaviors of the symmetric cells according to Example 1 and Comparative Example 1.

Referring to FIG. 4, it can be seen that an overvoltage increased after 50 cycles and an internal short circuit occurred in the symmetric cell according to Comparative Example 1.

Contrarily, the symmetric cell according to Example 1 revealed a stable electrochemical behavior even after 300 cycles.

Figure 5:
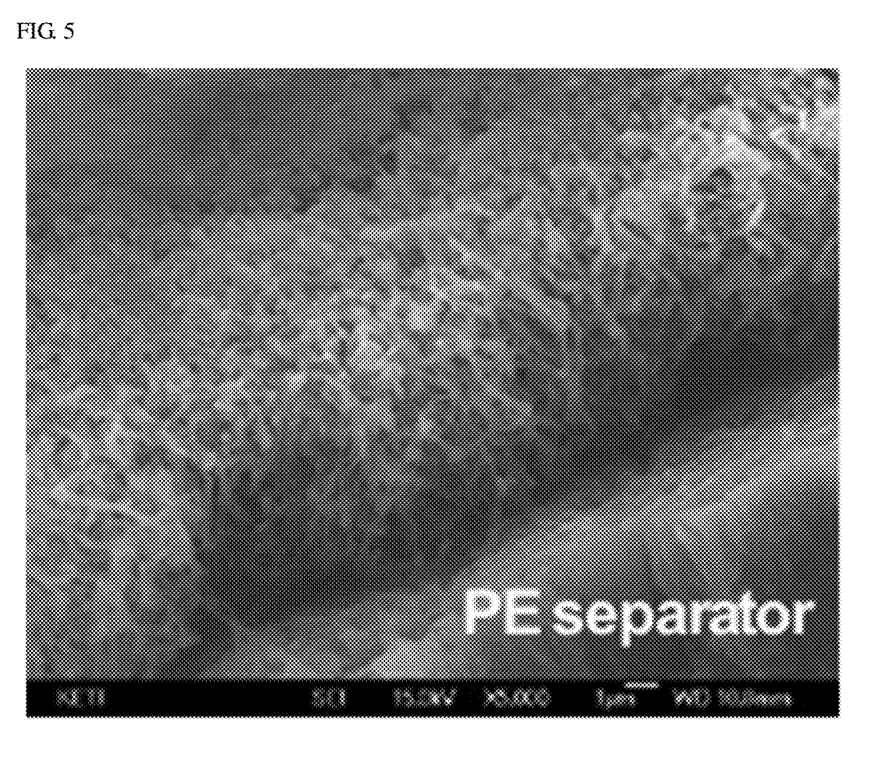
FIG. 5 is an SEM image of a separator according to Comparative Example 1 after an observation of electrochemical behaviors illustrated in FIG. 4 is completed.
Figure 6:
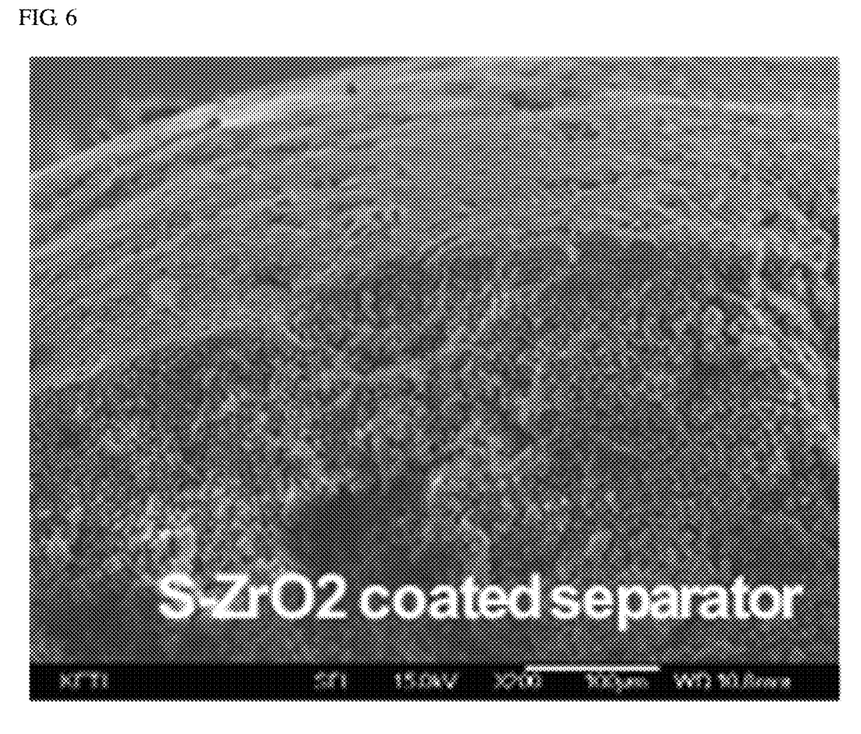
FIG. 6 is an SEM image of a separator according to Example 1 after an observation of electrochemical behaviors illustrated in FIG. 4 is completed.

In order to check the effect of coating the solid superacid coating layer on the separator, the symmetric cells according to Example 1 and Comparative Example 1 were dismantled after the observation of the electrochemical behaviors shown in FIG. 4 was completed, and changes in the morphology of lithium on the surfaces of the separators were examined by SEM images. The observation results are shown in FIGS. 5 and 6. FIG. 5 is an SEM image of the separator according to Comparative Example 1 after the observation of the electrochemical behaviors shown in FIG. 4 is completed. FIG. 6 is an SEM image of the separator of Example 1 after the observation of the electrochemical behaviors shown in FIG. 4 is completed.

It was found that lithium dendrites have grown on the surface of the separator according to Comparative Example 1 as shown in FIG. 5. On the other hand, it was found that the separator according to Example 1 maintained a dense structure with little growth of lithium dendrites as shown in FIG. 6.

Thus, the observation of the changes in the morphology of lithium on the surfaces of the separators according to Comparative Example 1 and Example 1 shows that the formation of the solid superacid coating layer on the separator of the lithium metal secondary battery can suppress the growth of lithium dendrites by improving the mobility and the reaction uniformity of lithium at the interface of the lithium metal negative electrode and the electrolyte solution. Also, the lithium metal secondary battery having the separator including the solid superacid coating layer may exhibit high energy density and superior lifespan characteristics.

Example 2

Though the solid superacid coating layer 33 is formed on the separator 30 according to Example 1, the present disclosure is not limited thereto. For example, a solid superacid coating layer 13 may be formed on the lithium metal negative electrode 10 interfacing with the electrolyte solution 40 as shown in FIG. 7.

Figure 7:
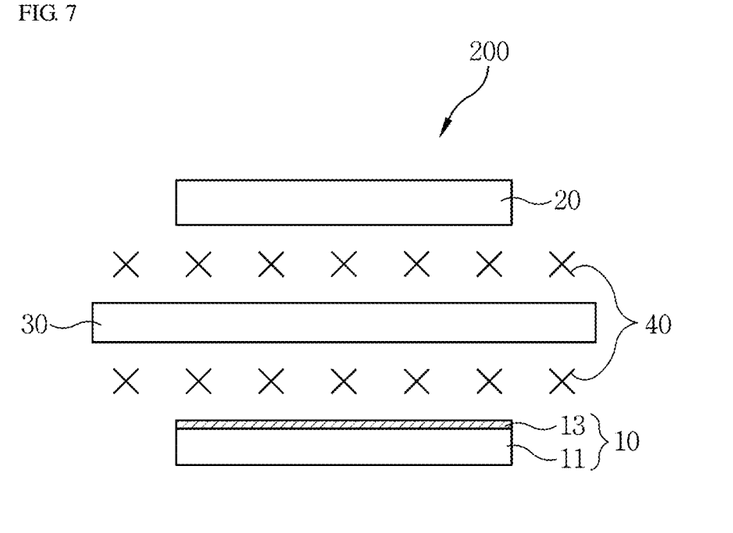
FIG. 7 is a schematic view illustrating a structure of a lithium metal secondary battery including a solid superacid coating layer according to Example 2 of the present disclosure.

FIG. 7 is a schematic view illustrating a structure of a lithium metal secondary battery 200 including a solid superacid coating layer according to Example 2 of the present disclosure.

Referring to FIG. 7, the lithium metal secondary battery 200 according to Example 2 includes the lithium metal negative electrode 10, the positive electrode 20, the separator 30, and the electrolyte solution 40. The solid superacid coating layer 13 is formed on a surface of the lithium metal negative electrode 10.

The lithium metal secondary battery 200 according to Example 2 has a configuration similar to the lithium metal secondary battery 100 according to Example 1 except that the solid superacid coating layer 13 is formed on the surface of the lithium metal negative electrode 10 in Example 2 while the solid superacid coating layer 33 is formed on the surface of separator 30 in Example 1. In particular, the positive electrode 20 and the electrolyte solution 40 in Example 2 may be the same as those in Example 1.

Therefore, the following description will focus on the lithium metal negative electrode 10 on which the solid superacid coating layer 13 is formed.

The lithium metal negative electrode 10 may include a lithium metal foil 11 and the solid superacid coating layer 13. The solid superacid coating layer 13 may be formed on a surface of the lithium metal foil 11 facing the separator 30. Alternatively, the solid superacid coating layer 13 may be formed on an entire surface of the lithium metal foil 11.

The solid superacid coating layer 13 may include 80 to 95 wt % of solid superacid and 5 to 20 wt % of binder. In case that the ratio of the solid superacid is 95 wt % or greater, there may be a problem that the binder is insufficient and the bonding strength of the solid superacid coating layer 13 is low. In case that the ratio of the solid superacid is less than 80 wt %, the effect owing to the solid superacid may be reduced.

The binder may include PVdF, polyethylene, and the like.

The solid superacid may be sulfated zirconia, sulfated titanium dioxide, sulfated tin dioxide, or sulfated aluminum oxide, but is not limited thereto. For example, the sulfated zirconia having a particle size of 3 micrometers or less and having a porous structure may be used as the solid superacid.

The lithium metal secondary battery 200 according to Example 2, which has the solid superacid coating layer 13 formed on the surface of the lithium metal negative electrode 10 interfacing with the electrolyte solution 40, may achieve the advantages and effects expected in the lithium metal secondary battery 100 according to Example 1.

On the other hand, through the solid superacid coating layer 13 is formed on the surface of the lithium metal negative electrode 10 according to Example 2, the present disclosure is not limited thereto. For example, solid superacid coating layers 13 and 33 may be formed on the surfaces of the separator 30 and the lithium metal negative electrode 10, respectively, which interface with the electrolyte solution 40.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A separator for use in a lithium metal secondary battery having a lithium metal negative electrode, comprising:
    a separator body; and
    a solid superacid coating layer capable of suppressing a growth of lithium dendrites, the solid superacid coating layer being coated on the separator body and comprising solid superacid material having a porous structure,
    wherein the solid superacid material has a solid particle surface modified with sulfate ion ($SO_4^{2-}$), and
    wherein the solid superacid coating layer is formed on a surface of the separator body facing the lithium metal negative electrode of the lithium metal secondary battery.

2. The separator as claimed in claim 1, wherein the solid superacid coating layer comprises 80 to 95 wt % of solid superacid material and 5 to 20 wt % of binder.

3. The separator as claimed in claim 1, wherein the solid superacid material comprises sulfated zirconia having a particle size of 3 micrometers or less and having the porous structure.

4. A lithium metal secondary battery comprising:
    a positive electrode;
    a lithium metal negative electrode;
    a separator disposed between the positive electrode and the lithium metal negative electrode; and
    an electrolyte solution comprising lithium salt,
    the separator comprising:
    a separator body; and
    a solid superacid coating layer capable of suppressing a growth of lithium dendrites, coated on the separator body, and comprising solid superacid material having a porous structure,
    wherein the solid superacid material has a solid particle surface modified with sulfate ion ($SO_4^{2-}$), and
    wherein the solid superacid coating layer is formed on a surface of the separator body facing the lithium metal negative electrode.

5. The lithium metal secondary battery as claimed in claim 4, wherein the solid superacid coating layer comprises 80 to 95 wt % of solid superacid material and 5 to 20 wt % of binder.

6. The lithium metal secondary battery as claimed in claim 4, wherein the solid superacid material comprises sulfated zirconia having a particle size of 3 micrometers or less and having the porous structure.

* * * * *